US008936458B2

(12) United States Patent
Senn et al.

(10) Patent No.: US 8,936,458 B2
(45) Date of Patent: Jan. 20, 2015

(54) DEVICE FOR FORMING PLASTICS MATERIAL PREFORMS INTO PLASTICS MATERIAL CONTAINERS WITH A VARIABLE OUTPUT RATE

(75) Inventors: Konrad Senn, Regensburg (DE); Rainer Englbrecht, Kelheim (DE); Heinz Humele, Thalmassing (DE)

(73) Assignee: Krones AG, Neutraubling (DE)

( * ) Notice: Subject to any disclaimer, the term of this patent is extended or adjusted under 35 U.S.C. 154(b) by 402 days.

(21) Appl. No.: 13/251,201

(22) Filed: Sep. 30, 2011

(65) Prior Publication Data

US 2012/0080827 A1    Apr. 5, 2012

(30) Foreign Application Priority Data

Oct. 1, 2010    (DE) .................. 10 2010 047 104

(51) Int. Cl.
*B29C 49/36*    (2006.01)
*B29C 49/78*    (2006.01)
(Continued)

(52) U.S. Cl.
CPC ........... *B29C 49/783* (2013.01); *B29C 49/6418* (2013.01); *B29C 2049/1261* (2013.01);
(Continued)

(58) Field of Classification Search
CPC .. B29C 49/12; B29C 49/36; B29C 49/78042; B29C 49/7805; B29C 49/7826; B29C 49/78294; B29C 49/78369; B29C 49/78378; B29C 49/78739; B29C 49/78882; B29C 49/7889
USPC ......................................... 425/135, 529, 540
See application file for complete search history.

(56) References Cited

U.S. PATENT DOCUMENTS

2002/0011681 A1 * 1/2002 Rose et al. .................... 264/40.1
2010/0078861 A1 * 4/2010 Herklotz et al. .............. 264/532
(Continued)

FOREIGN PATENT DOCUMENTS

DE    102007022386 A1    11/2007
DE    202008013419 A1    9/2009
(Continued)

OTHER PUBLICATIONS

Partial machine translation of EP2098356A2 dated Sep. 9, 2009 obtained from the WIPO website.*
(Continued)

*Primary Examiner* — Robert B Davis
(74) *Attorney, Agent, or Firm* — Novak Druce Connolly Bove + Quigg LLP

(57) ABSTRACT

A device for forming plastics material preforms into plastics material containers includes a plurality of blowing stations, each comprising blow moulds, inside which preforms can be formed into containers. The device includes an admission arrangement to expose the preforms, for the forming thereof, to a free-flowing medium, and stretching rods to extend the preforms in the longitudinal direction thereof. The device includes a transport arrangement which transports the blowing stations with the preforms along a first predefined transport path, and a control arrangement which controls movement of the stretching rods and exposure of the preforms to the freeflowing medium so that predefined sub-steps of the forming process are carried out during transport of the preforms along the first path. Sub-steps of the forming process can be carried out irrespective of geometric position of the preforms along the first path, and an output rate of the device can thus be changed.

19 Claims, 1 Drawing Sheet

(51) Int. Cl.
*B29C 49/64* (2006.01)
*B29C 49/12* (2006.01)
*B29C 35/08* (2006.01)
*B29C 49/48* (2006.01)
*B29C 49/42* (2006.01)

(52) U.S. Cl.
CPC ......... *B29C2035/0855* (2013.01); *B29C 49/48* (2013.01); *B29C 2049/1257* (2013.01); *B29C 2035/0822* (2013.01); *B29C 2049/4892* (2013.01); *B29C 2035/0838* (2013.01); *B29C 2049/4231* (2013.01); *B29C 2049/129* (2013.01); *B29C 49/12* (2013.01); *B29C 49/36* (2013.01); *B29C 49/4205* (2013.01); *B29C 49/78* (2013.01)
USPC ............................ 425/135; 425/529; 425/540

(56) References Cited

U.S. PATENT DOCUMENTS

2011/0037189 A1\* 2/2011 Balkau et al. ................ 264/40.3
2011/0260373 A1\* 10/2011 Finger et al. .................. 264/532

FOREIGN PATENT DOCUMENTS

EP          2098356 A2 \*  9/2009
WO    WO 2009109159 A1 \*  9/2009
WO    WO 2009144664 A2 \* 12/2009

OTHER PUBLICATIONS

Chinese Office Action dated Nov. 4, 2013, issued in corresponding Chinese Application No. 201102964012.

\* cited by examiner

DEVICE FOR FORMING PLASTICS MATERIAL PREFORMS INTO PLASTICS MATERIAL CONTAINERS WITH A VARIABLE OUTPUT RATE

CROSS-REFERENCE TO RELATED APPLICATION

This application claims the benefit of priority of German Patent Application No. 10 2010 047 104.6, filed Oct. 1, 2010, pursuant to 35 U.S.C. 119(a)-(d), the disclosure of which is incorporated herein by reference.

TECHNICAL FIELD

The present disclosure relates to a device for forming plastics material preforms into plastics material containers and, more particularly, to a device for forming plastics material preforms into plastics material containers with a variable output rate.

BACKGROUND

Devices for forming plastics material performs into plastics material containers, for example blow moulding machines, have long been known from the prior art. Heated plastics material preforms are fed to the blow moulding machines and are formed into plastics material containers, in particular by exposure to pressurised air.

In the prior art, such blow moulding machines and stretch blow moulding machines are always operated with a constant output rate. This is because the heating time and the output rate are directly linked owing to the current structure. However, the constant output rate leads to many drawbacks, in particular if the machine is installed in a "block" with subsequent machines, for example the labeling machine and/or the filler.

In this case the individual processing stations are fixedly connected to one another via transfer starwheels, and therefore so too are the output rates. However, it would often be advantageous if this block of machines could be slowed or accelerated as required, for example if faults occur in one of the subsequent units. However, this is not currently possible, in particular if the blow moulding machine is used as a lead machine.

WO 2010/015220 A1 describes a method and a device for blow moulding containers. The blow moulding machine has a stretching means which is controlled in such a way that a stretching rate directly after starting the device is predefined differently from a stretching rate in a production phase some time after operation is started.

The aim of this approach is that qualitatively high-grade containers can be produced with a short time delay before production start-up.

DE 10 2007 008 023 A1 describes a method and a device for the blow moulding of containers. The positioning of a stretching rod is pre-set with use of an electromechanical stretching rod drive, and a rotation of a motor shaft of a servomotor is transformed by a mechanical coupling means into a stroke movement of the stretching rod.

WO 2009/144664 A2 describes a system for blow moulding plastics material containers. Each blowing station comprises a drive motor which is coupled to stretching rods.

DE 101 53 045 A1 describes a method and a device for controlling a blow moulding process. In order to coordinate the control process temporarily, a current rotational positioning of the blowing wheel is measured and the corresponding measurement information is compared by an evaluation unit with pre-set switch positions for supplying and discharging the blowing fluid.

It may therefore be desirable to simplify the normal operation in particular of blocked systems which comprise a blow moulding machine, in particular to achieve a greater variability in terms of the output rate.

SUMMARY

According to various aspects of the disclosure, a device for forming plastics material preforms into plastics material containers comprises a plurality of blowing stations, wherein these blowing stations each comprise blow moulds, inside which plastics material preforms can be formed into the plastics material containers. Furthermore, the device comprises admission means in order to expose the plastics material preforms, for the forming thereof, to a free-flowing and in particular gaseous medium, as well as stretching rods in order to extend the plastics material preforms in the longitudinal direction.

In addition, the device comprises a transport means which transports the blowing stations with the plastics material preforms along a predefined transport path, as well as a control means which controls the movement of the stretching rods and the exposure of the plastics material preforms to the free-flowing medium in such a way that predefined sub-steps of the forming process are carried out during the transport of the plastics material preforms along the transport path.

In accordance with various aspects of the disclosure, sub-steps of the forming process can be carried out irrespective of the geometric position of the plastics material preforms along a transport path, and an output rate of the device can thus be changed. In this case "output rate" is understood to mean the number of containers produced per unit of time.

In the prior art the forming processes are normally carried out in a position-dependent manner, which is accomplished for example by guide cams for the stretching rods. In other words, in the prior art there is a correlation between the position of the plastics material preform on its transport path and the respective method step.

Within the scope of the disclosure is it proposed in particular that, although there is a correlation between the position of the plastics material preform and the respective method step, this correlation can be selected so that, for example the plastics material preform can be blown earlier or, for example, the plastics material preform can also be stretched earlier along the transport path.

The transport means for the plastics material preforms may in some aspects comprise a blowing wheel, on which the individual blowing stations are arranged, the transport path thus being circular or shaped as a segment of a circle. In accordance with various aspects of the disclosure, it is thus proposed that, for example, the peripheral angles at which specific method steps are carried out can be changed. Owing to the differently selectable switch points for the sub-steps, the transport rate of the transport means, for example the rotational speed of the blowing wheel and thus the output rate, can be changed on the whole.

The control means may in some aspects comprise a timer for controlling the movement of the stretching rods. In contrast to the prior art, the movement of the stretching rods and/or admission means is not controlled in a position-dependent manner, but instead is time-dependent so that, for example, the temporal sequence of the blowing process can be maintained irrespective of the transport rate of the transport means.

Nevertheless, it can thus be ensured that the quality of the containers thus produced remains the same, irrespective of the transport rate, since the corresponding forming process and in particular the coordination of the individual sub-steps occurs in a precisely determined and in particular also constant temporal sequence.

In some exemplary embodiments the control means comprises a timer for controlling the admission means.

The above-mentioned sub-steps of the forming process are in some aspects selected from a group of sub-steps which contains a pre-blowing of the plastics material preform, a primary blowing of the plastics material preform, and a stretching of the plastics material preform with the aid of the stretching rod and the like.

In some exemplary embodiments each blowing station comprises a drive means for moving the stretching rod, and these drive means can be controlled independently of one another. For example, electric motors, in particular linear motors, servomotors, hydraulic cylinders or pneumatic cylinders may be used as drive means.

In some exemplary embodiments the device comprises a rotatable support on which a plurality of blowing stations are arranged. The blowing stations are thus transported, at least in portions, on a circular path. In this embodiment the device is therefore in particular a "rotary machine".

In some exemplary embodiments the device comprises a heating device for heating the plastics material preforms and a transport means which transports the plastics material preforms, during the heating process, along a second predefined transport path. In addition, this heating device is arranged in a transport means of the plastics material preforms before the above-described device and the individual blowing stations.

As mentioned at the outset, such systems normally also comprise, in addition to the actual (stretch) blow moulding machine, a heating means which heats the plastics material preforms. However, it would in principle also be possible for the plastics material preforms to be formed by the stretch blow moulding machine directly after their production.

Furthermore, the plastics material preforms can be heated irrespective of the geometric position of the plastics material preforms along the second transport path. It is therefore proposed for the heating device also to be designed in such a way that the heating process can be adapted, wherein in particular an output rate of the heating device can also be changed. A particular advantage of this design is that such a heating device can then be operated blocked with the subsequent stretch blow moulding machine.

In other words, the duration of the heating process can preferably be varied with the heating device independently of the output rate, that is to say can likewise be carried out with a variable output rate. For example, the heating device can be controlled in such a way that the heating power or heating energy introduced into the plastics material preforms can be kept constant, basically irrespective of the transport rate of the plastics material preforms, and an end temperature of the plastics material preforms when leaving the heating means remains basically constant. In this case, too, the described heating process is in some aspects time-controlled or temperature-controlled and, in particular, is not position-controlled.

For example, it is thus possible for the plastics material preforms to be heated in the heating means, independently of the transport rate, until a specific setpoint temperature is reached. For this purpose the heating means in some aspects comprises sensor means which, in particular, also remotely measure a temperature of the plastics material preforms. The heating device is in some aspects synchronised with the above-mentioned device.

The system in some aspects comprises a timer and/or temperature control for heating the plastics material preforms along the second transport path.

If the output rate is now to lie below the maximum output, the machine speed of the heating means is slowed and the moment at which and thus also the position in which the heating process begins is shifted, for example backwards in a proportional manner, so that between the end of the heating process and the start of the stretch blow moulding process, the time can be kept approximately constant irrespective of the machine output. In addition it would also be possible to slow the energy supply for heating the plastics material preforms.

As mentioned above, in this instance a time-controlled blow moulding process is in some aspects in addition to the time-controlled heating process, wherein for example this is to be achieved since the plastics material preform is no longer stretched mechanically via a stationary cam, but by a time-controlled electric drive. However, it would also be conceivable to further use a cam-controlled stretching means and to carry out an adjustment to the switch points of the individual blowing valves which carry out the blow moulding process, in order to thus influence the result of the blow moulding process.

In some exemplary embodiments the system comprises further units, in particular downstream of the blow moulding machine, such as labeling machines, filling means and the like.

Procedurally, situations may arise in such systems in which a lower output would be desirable. Examples of this are a roller change of the labeling unit or of a packaging machine (for example fitting a new packaging roll) or if the machine has to be operated at reduced output rate when carrying out an auto-splicing function. In particular with blocked installation, the output of the blow moulding machine can also be adapted during production with implementation of the method.

In general, this can be applied precisely when material supply processes at reduced output set the throughput of the system following the blow moulding machine to zero, either minimally or locally at downstream points, or else by switching off the individual machines to be supplied. After the corresponding material supply process, the output can be increased again to a normal value. This type of control can take place either in an automated manner, or can be carried out by the operator selectively by adjusting the blow moulding machine.

An output adjustment may also be in some aspects in terms of process or as a result of external environmental influences. For example, if the product starts to foam up during the filling process as a result of changes in the product, it is expedient to reduce the output of the blow moulding machine and of the filler until the effect is no longer observed. An increase in output may then be implemented subsequently. In this case the output of the blow moulding machine can also be adjusted during production with implementation of the method, in particular in the case of blocked installations. Further examples are different qualities of the materials to be processed, such as the plastics material preforms, the product, or the packaging materials such as films.

In general, the output can be adjusted by the method if there are procedural requirements. This type of control may take place either in an automated manner or can be carried out selectively by the operator by adjusting the blow moulding machine.

Furthermore, situations in which it is necessary to adjust the output rate of the machines may arise from energy effects at system level or from external influencing factors, such as availability of resources in terms of logistics.

Generally, the method described here can be used to control a system based on material supply processes and procedural requirements, and to affect in particular the system and also external influencing factors in terms of energy.

In some exemplary embodiments the heating device comprises a plurality of heating means to individually heat the plastics material preforms. For example, individual heat cavities can thus be provided, in which individual or groups of preforms are arranged. It is thus made possible to individually heat the plastics material preforms and, in this manner, it is also possible to react quickly to requirements, in particular external requirements. These heating means can in some aspects be controlled in such a way that, as mentioned above, the energy introduced into the plastics material preforms remains the same, even if the transport rate is changed.

In some exemplary embodiments the heating device is a microwave-based heating device or comprises microwave-based heating means. Such microwave-based heating means are known form the prior art, for example DE 10 2007 022 386 A1. The disclosure of this document is hereby also incorporated fully in the disclosure of the present application. For the present disclosure microwave-based heating means may be advantageous in a specific manner, since the individual heating of the plastics material preforms can be controlled quickly and in an uncomplicated manner by microwave technology. Alternatively however, other individual heating means, such as laser or STIR heating, are also conceivable.

In some exemplary embodiments at least one heating means, in some aspects a plurality of and in other aspects all heating means are movable. In particular the heating means are movable together with the preforms, for example even if they are designed as mould cavities.

In some exemplary embodiments the system comprises additional units, wherein these additional units are in particular arranged downstream of the forming means. These downstream units are selected from a group of units which includes labeling machines, fillers, rinsers, sterilising means and the like.

In some exemplary embodiments the heating device is selected from a group of heating devices which includes microwave-based heating devices, laser-based heating devices, infrared heating devices, STIR (selective transformed infrared) heating devices, combinations thereof and the like. The heating device is in some aspects a microwave-based heating means.

The present disclosure is further directed to a method for forming plastics material preforms into plastics material containers. The plastics material preforms are formed into the plastics material containers in a plurality of blowing stations, wherein said plastics material preforms, for the forming thereof, are exposed to a free-flowing medium by means of admission means during this forming process and are extended by means of stretching rods in the longitudinal direction, and wherein the blowing stations are transported with the plastics material preforms along a predetermined first transport path. The movements of the stretching rods and the exposure of the plastics material preforms to the free-flowing material are controlled in such a way that predefined sub-steps of the forming process are carried out during the transport of the plastics material preforms along this transport path.

The sub-steps of the forming process are carried out, at least in part, irrespective of the geometric position of the plastics material preforms along the transport path so as to change or be able to change the output rate of the formed plastics material containers as a result of this freedom.

It is therefore also proposed in terms of the method that the control process is not undertaken in a position-dependent manner, but for example in a time-dependent or temperature-dependent manner. As mentioned above, the output rate of such a forming unit can thus be changed if required.

In an exemplary method at least the movement of the stretching rods or the exposure of the plastics material preforms to the free-flowing medium is controlled in a time-dependent and/or temperature-dependent manner, and in particular in a time-dependent manner. The separate stretching rods or the movement thereof is/are in some aspects controlled individually.

In an exemplary method the transport rates of the plastics material preforms through a device and through a heating device for heating the plastics material preforms are matched to one another. This means that the device for forming the plastics material preforms is operated in a synchronised or blocked manner with one of these, in particular upstream, heating means for heating the plastics material preforms.

Further advantages and embodiments will emerge from the accompanying drawings.

DETAILED DESCRIPTION

Figure 1:
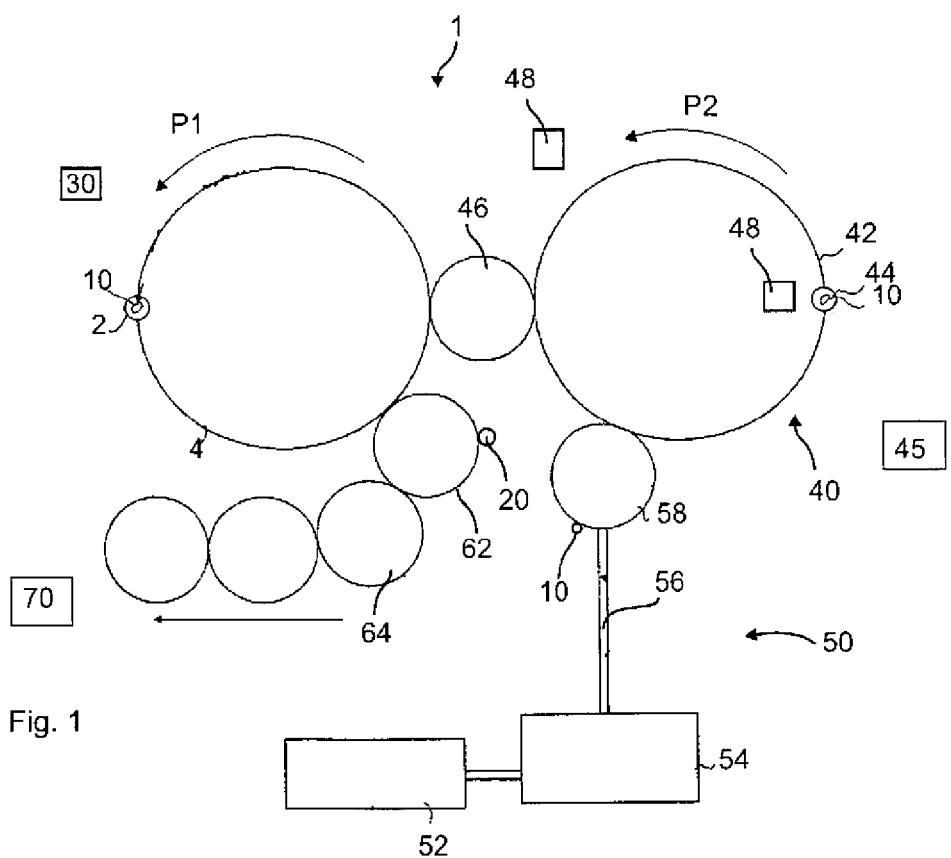
FIG. 1 is a roughly schematic view of an arrangement for processing plastics material containers, and in particular of a system for producing plastics material containers.

FIG. 1 shows a schematic view of a device 1 according to the disclosure for producing plastics material containers. The plastics material preforms are first fed via a store such as a chute 52 to a sorting unit 54, where they are then fed via a feed rail 56 and a transport starwheel 58 to the heating device, denoted as a whole by reference numeral 40. For example, the transport means 58 may be a sawtooth starwheel which already transports the plastics material preforms individually. The heating device also comprises a plurality of heating means 44 or heating chambers which transport the plastics material preforms 10. These individual heating means or heating chambers 44 are arranged on a support wheel 42 in such a way that the plastics material preforms 10 are also guided along a substantially circular second transport path P2.

For example, depending on a rotational speed of the support wheel 42, a control means 30 can determine when or at which peripheral angle the heating process will start for a specific plastics material preform. It would thus be possible for the heating process to begin at an earlier moment in time along the transport path P2 at a quicker transport rate, and at a later moment in time in the case of a slower rate so that the time required to heat the plastics material preforms 10 is basically constant irrespective of the rotational speed of the support wheel and the plastics material preforms leave at substantially the same end temperature. An adjustment of the heating power would also be conceivable. Reference numeral 45 denotes a control means for controlling the heating device 40. It would additionally be possible to provide sensor means 48 which may preferably remotely detect a temperature of the plastics material preforms. It would thus also be possible for the further heating process to be stopped when a specific temperature of the plastics material preforms is reached. The sensor means 48 may be arranged in a stationary manner and/or also movably, and in particular may be arranged on the support wheel 42.

The now heated plastics material preforms are supplied, via a further transport means such as a transfer starwheel 46, to a device 1 according to the disclosure for forming plastics material preforms into plastics material containers. This device 1 comprises a support wheel 4 on which a plurality of blowing stations 2 (only one of which is shown) are arranged. As mentioned above, the individual parameters for the forming process, for example the blowing pressure, a movement of the stretching rods and the like are not controlled in a position-dependent manner, as is conventional in the prior art, but also in a time-dependent manner.

In this way, the actual forming process can also remain unchanged, in particular in terms of its temporal sequences, irrespective of a rotational speed of the support or blowing wheel 4. For example, it can thus be ensured that a stretching rod movement from its upper stop to its lower stop always requires the same predefined time, in particular irrespective of a speed of the blowing wheel 4. This means that, with a faster rotational speed of the blowing wheel 4, the section of the transport path P1 along which the plastics material preforms are guided during the forming process and during which the forming process takes place, is longer or spans a greater peripheral angle than with a slower movement of the blowing wheel 4. The finished plastics material containers 20 are transported to a filling means 70 via a plurality of transport starwheels 62, 64.

Reference numeral 30 refers to a control means which, as mentioned above, controls a movement of the stretching rods and the exposure of the plastics material preforms to air.

Figure 2:
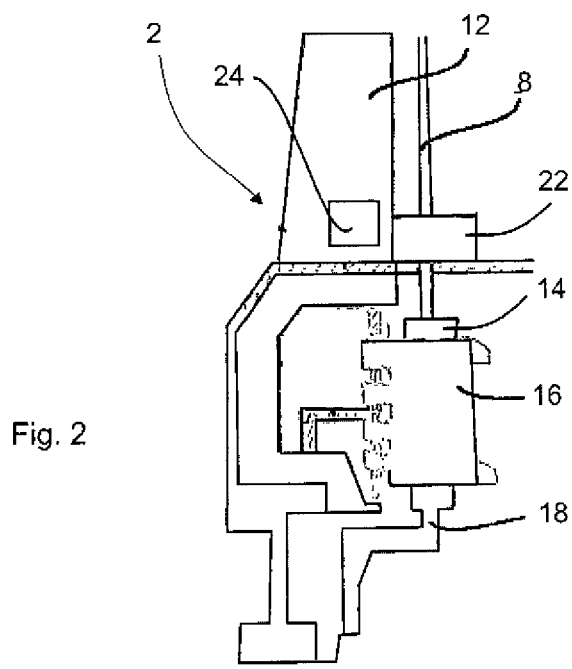
FIG. 2 shows a device according to the disclosure for forming plastics material preforms into plastics material containers.

FIG. 2 is a schematic view of a blowing station 2. This blowing station 2 comprises a mould support 16 which comprises a blow mould (not shown) for forming plastics material preforms into plastics material containers. Pressurised air can be fed to the plastics material preform for expansion thereof via an admission means 14 which, for example, may comprise a blowing nozzle. A valve block (not shown) is further provided, with which the pressurised air feed to the plastics material preform can be controlled (in particular also with use of a number of pressure levels). Reference numeral 8 denotes a stretching rod which, during the forming process, stretches the plastics material preform. This stretching rod is arranged so as to be movable via a slide 22 on a support 12. Reference numeral 18 denotes a base part which seals the blow mould from below. It would also be possible for the opening and closing procedures to likewise be time-controlled (and not position-controlled). Reference numeral 24 denotes, roughly schematically, a drive means for moving the stretching rod. For example, this drive means 24 may be an electric motor drive.

It will be apparent to those skilled in the art that various modifications and variations can be made to the device for forming plastics material preforms into plastics material containers with a variable output rate of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A device for forming plastics material preforms into plastics material containers, comprising:
   a plurality of blowing stations, said blowing stations each comprising blow moulds, inside which the plastics material preforms can be formed into the plastics material containers;
   admission means in order to expose the plastics material preforms, for the forming thereof, to a free-flowing medium, and stretching rods in order to extend the plastics material preforms in the longitudinal direction (L) thereof;
   a transport means which transports the blowing stations with the plastics material preforms along a first predefined transport path; and
   a control means which controls the movement of the stretching rods and the exposure of the plastics material preforms to the free-flowing medium in such a way that predefined sub-steps of the forming process are carried out during the transport of the plastics material preforms along the first transport path,
   wherein sub-steps of the forming process can be carried out irrespective of the geometric position of the plastics material preforms along the first transport path, and an output rate of the device can thus be changed, and wherein the sub-steps have differently selectable switch points.

2. The device according to claim 1, wherein the control means comprises a timer for controlling the movement of the stretching rods.

3. The device according to claim 1, wherein the control means comprises a timer for controlling the admission means.

4. The device according to claim 1, wherein each blowing station comprises a drive means for moving the stretching rod, and said drive means can be controlled independently of one another.

5. The device according to claim 1, wherein each blowing station comprises a drive means for moving the stretching rod, and said drive means can be controlled independently of one another.

6. The device according to claim 1, comprising a heating device for heating the plastics material preforms and comprising a transport means which transports the plastics material preforms during the heating thereof along a second predefined transport path, wherein said heating device is arranged before the blowing stations in the direction of transport of the plastics material preforms.

7. The device according to claim 6, wherein the plastics material preforms can be heated irrespective of the geometric position of the plastics material preforms along the second transport path.

8. The device according to claim 6, wherein the device comprises a timer and/or temperature control for heating the plastics material preforms along the transport path.

9. The device according to claim 6, wherein the heating device comprises a plurality of heating means for individually heating the plastics material preforms.

10. The device according to claim 6, wherein the heating device is selected from a group of heating devices which includes microwave-based heating devices, laser-based heating devices, infrared heating devices, STIR heating devices, combinations thereof and the like.

11. A device for forming plastics material preforms into plastics material containers, comprising:

a plurality of blowing stations, said blowing stations each comprising blow moulds, inside which the plastics material preforms can be formed into the plastics material containers;

an admission arrangement in order to expose the plastics material preforms, for the forming thereof, to a free-flowing medium, and stretching rods in order to extend the plastics material preforms in the longitudinal direction thereof;

a transport arrangement which transports the blowing stations with the plastics material preforms along a first predefined transport path; and a control arrangement which controls the movement of the stretching rods and the exposure of the plastics material preforms to the free-flowing medium in such a way that predefined sub-steps of the forming process are carried out during the transport of the plastics material preforms along the first transport path, wherein sub-steps of the forming process can be carried out irrespective of the geometric position of the plastics material preforms along the first transport path, and an output rate of the device can thus be changed, and wherein the sub-steps have differently selectable switch points.

12. The device of claim 6, wherein a duration of a heating process can be varied with the heating device independently of the output rate.

13. The device of claim 6, wherein the heating device can be controlled to introduce a constant heating power into the plastics material preforms.

14. The device of claim 13, wherein the constant heating power is constant irrespective of a transport rate of the plastics material preforms and an end temperature of the plastics material preforms when leaving the heating device.

15. The device of claim 12, wherein the heating process is at least one of time-controlled or temperature-controlled, and wherein the heating process is not position-controlled.

16. The device of claim 6, wherein the heating device heats the plastics material preforms independently of a transport rate, until a specific setpoint temperature is reached.

17. The device of claim 6, wherein the heating device comprises a sensor which remotely measures a temperature of the plastics material preforms.

18. The device of claim 17, wherein the heating device is synchronized with the sensor.

19. The device of claim 6, wherein the heating device is installed in a block with at least one subsequent stretch blow moulding machine.

* * * * *